United States Patent
Hinchliffe et al.

(10) Patent No.: US 8,621,077 B2
(45) Date of Patent: Dec. 31, 2013

(54) DISTRIBUTION OF SECURITY POLICIES FOR SMALL TO MEDIUM-SIZED ORGANIZATIONS

(75) Inventors: Alex J. Hinchliffe, Buckinghamshire (GB); Fraser P. Howard, Oxon (GB); Bobby Rai, Northants (GB); Andrew Kemp, Oxon (GB)

(73) Assignee: McAfee, Inc., Santa Clara, CA (US)

( * ) Notice: Subject to any disclaimer, the term of this patent is extended or adjusted under 35 U.S.C. 154(b) by 1582 days.

(21) Appl. No.: 09/962,981

(22) Filed: Sep. 21, 2001

(65) Prior Publication Data

US 2013/0247128 A1    Sep. 19, 2013

(51) Int. Cl.
*G06F 15/173* (2006.01)

(52) U.S. Cl.
USPC ............... 709/225; 709/223; 709/224

(58) Field of Classification Search
USPC ............ 709/220, 223, 230, 217, 225
See application file for complete search history.

(56) References Cited

U.S. PATENT DOCUMENTS

| | | | | |
|---|---|---|---|---|
| 5,724,512 A * | 3/1998 | Winterbottom | ............... | 709/226 |
| 5,987,610 A | 11/1999 | Franzcek et al. | | |
| 6,059,842 A * | 5/2000 | Dumarot et al. | ............... | 717/153 |
| 6,073,142 A | 6/2000 | Geiger et al. | | |
| 6,212,635 B1 * | 4/2001 | Reardon | ............... | 713/165 |
| 6,385,770 B1 * | 5/2002 | Sinander | ............... | 717/170 |
| 6,460,050 B1 | 10/2002 | Pace et al. | | |
| 6,598,057 B1 * | 7/2003 | Synnestvedt et al. | ............... | 1/1 |
| 6,625,642 B1 * | 9/2003 | Naylor et al. | ............... | 709/206 |
| 6,715,075 B1 * | 3/2004 | Loukianov | ............... | 713/176 |
| 6,721,880 B1 * | 4/2004 | Pike | ............... | 713/1 |
| 6,769,068 B1 * | 7/2004 | Brozowski et al. | ............... | 713/202 |
| 6,868,444 B1 * | 3/2005 | Kim et al. | ............... | 709/223 |
| 6,871,221 B1 * | 3/2005 | Styles | ............... | 709/221 |
| 6,973,034 B1 * | 12/2005 | Natarajan et al. | ............... | 370/232 |
| 7,062,649 B2 * | 6/2006 | Daniell et al. | ............... | 713/165 |
| 7,185,364 B2 * | 2/2007 | Knouse et al. | ............... | 726/8 |
| 7,194,730 B2 * | 3/2007 | Pramberger | ............... | 717/120 |
| 7,334,252 B1 * | 2/2008 | Millet et al. | ............... | 725/111 |
| 7,506,155 B1 | 3/2009 | Stewart et al. | | |
| 7,525,484 B2 * | 4/2009 | Dupray et al. | ............... | 342/450 |
| 7,587,368 B2 * | 9/2009 | Felsher | ............... | 705/65 |
| 2002/0065878 A1 * | 5/2002 | Paxhia et al. | ............... | 709/203 |

* cited by examiner

*Primary Examiner* — Waseem Ashraf
(74) *Attorney, Agent, or Firm* — Patent Capital Group (57) ABSTRACT

A security policy distribution system encapsulates parameters for a security policy and instructions for applying the parameters to a corresponding security program into a self-contained configuration file. When the self-contained configuration file is executed on behalf of a computer, the corresponding security program on the computer is updated with the parameters, thus distributing the security policy to the computer.

20 Claims, 5 Drawing Sheets

DISTRIBUTION OF SECURITY POLICIES FOR SMALL TO MEDIUM-SIZED ORGANIZATIONS

FIELD OF THE INVENTION

This invention relates generally to computer security, and more particularly to distributing security policies.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Network Associates Technology, Inc., All Rights Reserved.

BACKGROUND OF THE INVENTION

Large organizations often manage their computer security policies from a central location, usually employing a single, often dedicated, computer server to manage the security polices on networked user (client) computers. Small to medium-sized organizations generally cannot afford, or do not require, such centralized security management but still need the security policies to be consistent on the clients. In such organizations, the systems administrator typically installs the identical security policies on each client manually, and manually updates each client as the policies change.

SUMMARY OF THE INVENTION

A security policy distribution system encapsulates parameters for a security policy and instructions for applying the parameters to a corresponding security program into a self-contained configuration file. When the self-contained configuration file is executed on behalf of a computer, the corresponding security program on the computer is updated with the parameters, thus distributing the security policy to the computer. In one aspect, the self-contained configuration file is stored on a server and is executed from the server by a client computer or downloaded from the server and executed on the client computer. In another aspect, the self-contained configuration file is stored on a peer node for download and execution on another peer node.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIG. 1, which a security policy distribution system 100 that does not rely on a centralized server. An administrator sets parameters for a security policy 103 on an administration machine 101 using a configuration procedure provided by the underlying security software, such as an anti-virus program or a software firewall. Once the administrator indicates that the parameters are correct, a security administration process presents the administrator with the option of creating a self-contained configuration file 105, which encapsulates the security parameters with instructions that apply the parameters to the corresponding security software when the self-contained configuration file 105 is executed on a computer, such as client computer 109 or peer computer 111. The instructions may be in the form of program code or a scripting language and the self-contained configuration file 105 may be an executable file, a registry file, an XML (extensible markup language) file or the like. The security administration process may be incorporated within the underlying security software or may be an external process.

Figure 1:
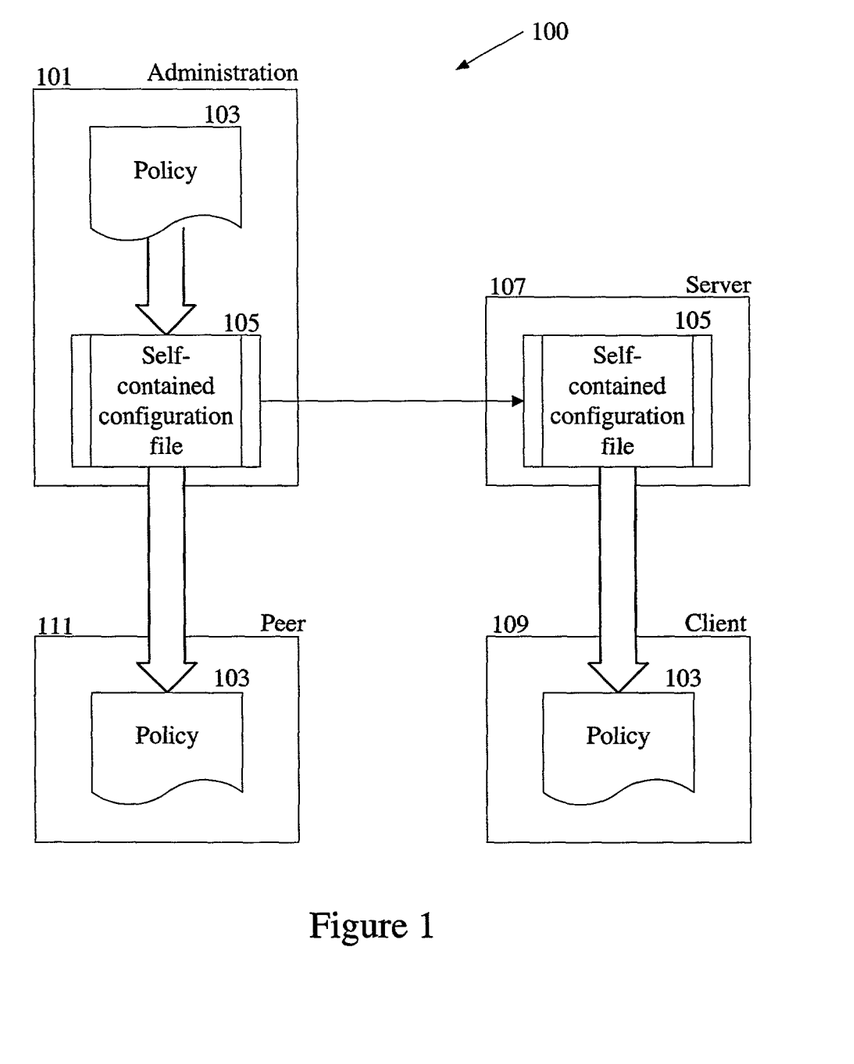
FIG. 1 is a diagram illustrating a system-level overview of an embodiment of the invention.

Assuming the computer is part of a client-server network, as illustrated by client computer 109 in FIG. 1, the self-contained configuration file 105 is stored on the network server 107, either manually by the administrator or automatically by the configuration process. A login script for the client 109 has previously been modified to search for updated self-contained configuration files as part of the client login procedure. Upon finding an updated self-contained configuration file 105, in one embodiment the login script downloads the self-contained configuration file 105 to the client 109 and executes it to apply the parameters against the corresponding security software, thus replicating the policy 103 on the client 109. In an alternate embodiment, the self-contained configuration file 105 is executed on the server 107 to replicate the policy 103 on the client 109. The replication may be performed as a background task so the user of the client computer 109 is unaware of the process. Typically, the login script resides on the server 109 but it will be appreciated that the replication process of the invention can be incorporated into login scripts that reside, in part or in total, on the client 109.

If the network is a peer-to-peer network, i.e., there is no server computer 107, the self-contained configuration file 105 may stored on the administration computer 101 or other peer node from where it will be downloaded to the peer computer 111 for execution. In one embodiment, the download and execution of the self-contained configuration file 105 is a manual process initiated by the administrator at every peer computer 111. In another embodiment, the administrator attaches the self-contained configuration file 105 to an email message that requests the user detach (download) and execute the file. In yet another embodiment, a policy script that downloads and executes the self-contained configuration file 105 is distributed to the peer computer 111. The execution of the policy script could be scheduled through a standard operating system task scheduler or as part of the boot-up process of the peer computer 111. Further alternate embodiments will be readily conceived by one of skill in the art and are considered within the scope of the invention.

Because certain types of executable files are susceptible to security breaches, i.e., virus infections, security software on the administration computer 101 would ensure that the self-contained configuration file 105 is uncontaminated prior to distributing it to the peer computer or to the server. If the self-contained configuration file is of a type that is not susceptible to security breaches, this precaution is not necessary.

Because the execution of out-dated versions of the self-contained configuration file could cause security vulnerabilities, in one embodiment, the self-contained configuration file 105 contains an instruction that renders the file 105 unusable after a certain period of time. In an alternate embodiment, a self-contained configuration file that is downloaded to a computer for execution would be deleted once it executed.

It is also contemplating that the creation of the self-contained configuration files could be logged to provide a record of what security policies were distributed at various point in time. In addition, if the underlying security software is not installed on the computer, an instruction in the self-contained configuration file 105 would alert the administrator to the problem by logging an error message on server 107 or the administration computer 101, by displaying the error message on the administration computer 101, or through other similar mechanisms.

The operations of an embodiment of a security policy distribution system 100 have been described in which the security policy is pulled by a user computer, either automatically or manually, in contrast to centralized security policy servers that push the security policies to user computers. Although alternate embodiments have been described to cover client-server and peer networks, one of skill in the art will immediately appreciate that the embodiments may be combined when necessary. Furthermore, while the security policy 103 has been described as being created on an administration computer 101, the invention is not so limited. In general, smaller organizations have only a single server on which the self-contained configuration file would be stored, but the invention is equally applicable in configurations having multiple servers, including those in which the servers are networked together in a peer arrangement or in a hierarchy, in which the self-contained configuration file is mirrored among the servers either manually or automatically.

Next, the particular methods of the invention that perform the operations of the embodiment of the security policy distribution system described in FIG. 1 are described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (the processing unit of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 2A:
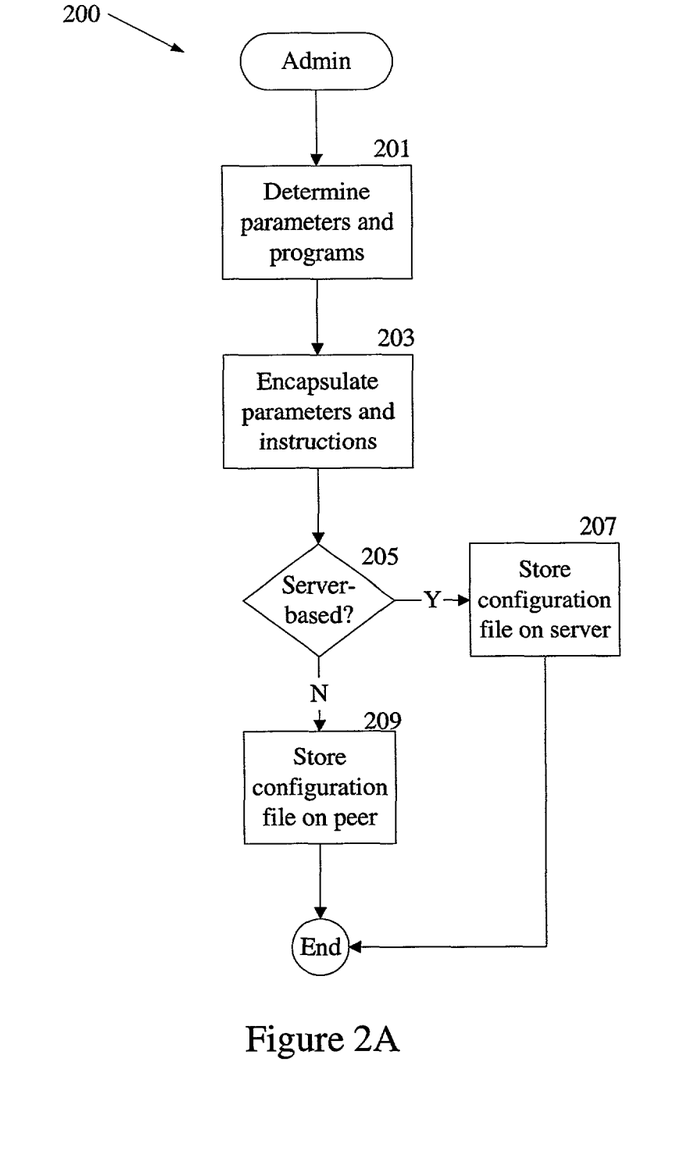
FIG. 2A is a flowchart of a security administration method to be performed by the embodiment of the invention shown in FIG. 1.

Referring first to FIG. 2A, the acts to be performed by a computer, such as the administration computer 101 in FIG. 1, when executing a security administration method 200 is shown. The method 200 is invoked when the administrator chooses to create a self-contained configuration file. The method 200 determines which security policy parameters have changed, and thus which of the underlying security programs are affected (block 201). The method 200 encapsulates the changed parameters and the execution instructions associated with the affected programs to create the self-contained configuration file (block 203). If the configuration file is to be distributed through a client-server network (block 205), the method 200 stores the configuration file on the server (block 207). Otherwise, the configuration file is stored on a designated peer node at block 209. It will be appreciated that the process represented by block 209 encompasses both storing the self-contained configuration file locally on the computer executing the security administration method 200 as well as storing it on another peer node. In an alternate embodiment, the administrator manually transfers the self-contained configuration file to the server or designated peer node, so the processing represented by blocks 205 until 209 is not performed.

Figure 2B:
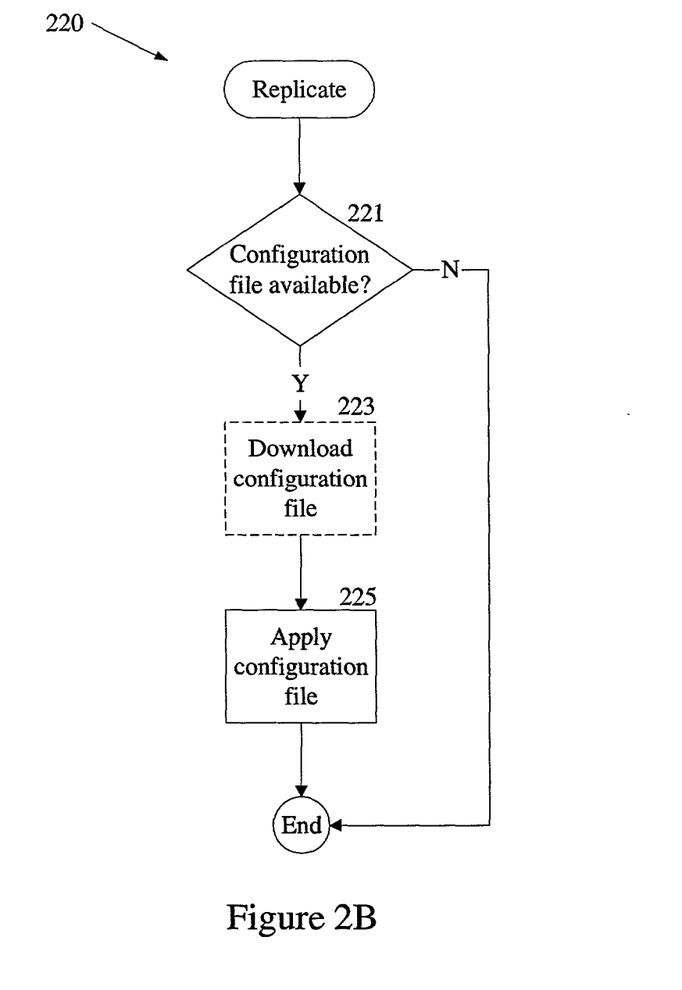
FIG. 2B is a flowchart of a security policy replication method to be performed by the embodiment of the invention shown in FIG. 1.

FIG. 2B illustrates a replicate method 220 that is executed by a user computer, such as client 109 or peer 111 in FIG. 1, to replicate the security policy on the user computer using a script, such as a login script or policy script as described previously. The replicate method 220 determines if an updated self-contained configuration file is available (block 221). If so, the updated self-contained configuration file is downloaded if necessary (block 223, shown in phantom) and applied, i.e., executed (block 225). It will be appreciated that the self-contained configuration file may actually execute on the server so the processing represented by block 223 is omitted under those circumstances. Processes similar to those illustrated in FIG. 2B would be performed by the administrator or user to manually replicate the security policy on a user computer.

The methods performed by an administration computer and a user computer have been shown by reference to flowcharts in FIGS. 2A and 2B, respectively, including all the acts from 201 until 209 and from 221 until 225. It will be appreciated that more or fewer processes may be incorporated into the methods illustrated in FIGS. 2A-B without departing from the scope of the invention, and that no particular order is implied by the arrangement of blocks shown and described herein.

Figure 3A:
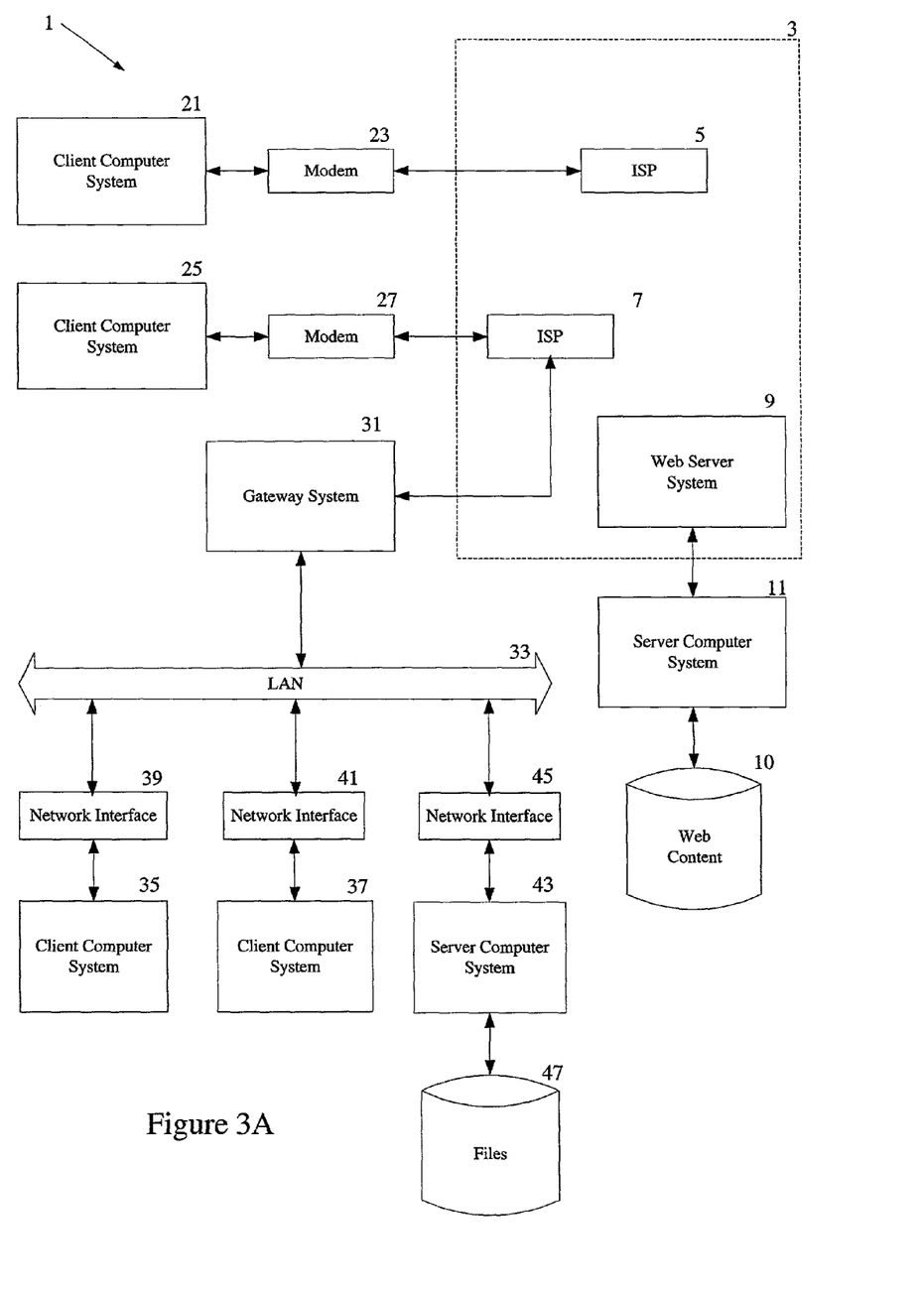
FIG. 3A is a diagram of one embodiment of an operating environment suitable for practicing the present invention.
Figure 3B:
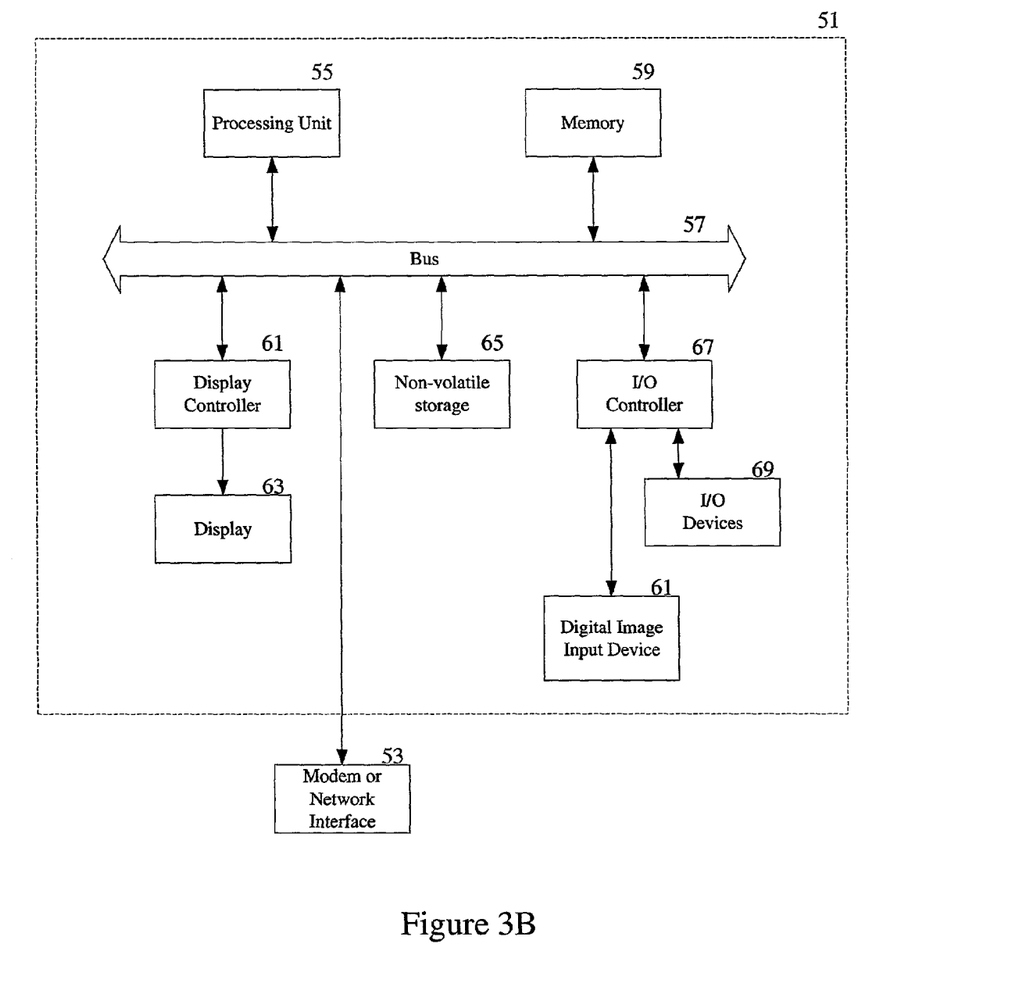
FIG. 3B is a diagram of one embodiment of a computer system suitable for use in the operating environment of FIG. 3A.

The following description of FIGS. 3A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 3A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 3A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 3A, the connections are not the same for these three computer systems. Client computer system 25 is coupled through a modem interface 27 while client computer systems 35 and 37 are part of a LAN. While FIG. 3A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 61 can be a digital camera which is coupled to the I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

A security policy distribution system that operates without a centralized security server has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to network communications is meant to include all communication media and environments, including local and wide area networks, public and private communications environments, and wired and wireless communications media. Therefore, it is manifestly intended that this invention be limited only by the following claims and equivalents thereof.

What is claimed is:

1. A method, comprising:
    providing a configuration procedure for an antivirus program to determine which parameters of a security policy have changed;
    creating a self-contained configuration file based on the changed security policy parameters and underlying security programs that are affected by the changed security policy parameters;
    determining which of the underlying security programs are affected based on the determined changed security policy parameters;
    encapsulating the changed parameters and execution instructions associated with the affected programs to create the self-contained configuration file;
    providing the self-contained configuration file in an e-mail to be communicated over a network from a server to a client device for subsequent installation at the client device, wherein a login script, which was previously modified on the client device, is provided to search for updated self-contained configuration files as part of a client login procedure, and wherein detection of the updated self-contained configuration files results in an application of particular parameters of the updated self-contained configuration files being applied against corresponding security software of the client device to replicate the security policy, and wherein the self-contained configuration file includes a first instruction that renders the self-contained configuration file unusable by the client device after a certain period of time, and wherein the self-contained configuration file includes a second instruction for deleting the self-contained configuration file once it is executed; and
    receiving an error message if the self-contained configuration file is not installed on the client device.

2. The method of claim 1, wherein the self-contained configuration file is downloadable from a first computer to a second computer for execution.

3. The method of claim 1 further comprising:
    storing the self-contained configuration file in a database.

4. The method of claim 1, wherein a policy script that executes a subsequent self-contained configuration file is provided as part of an operating system task schedule.

5. The method of claim 1, wherein the self-contained configuration file is one of an executable file, a registry file, and an extensible markup language file.

6. Computer executable instructions embodied in non-transitory computer readable media for execution in conjunction with a processor, the instructions being configured for performing operations, comprising:
    providing a configuration procedure for an antivirus program to determine which parameters of a security policy have changed;
    creating a self-contained configuration file based on the changed security policy parameters and underlying security programs that are affected by the changed security policy parameters;
    determining which of the underlying security programs are affected based on the determined changed security policy parameters;
    encapsulating the changed parameters and execution instructions associated with the affected programs to create the self-contained configuration file;
    providing the self-contained configuration file in an e-mail to be communicated over a network from a server to a client device for subsequent installation at the client device, wherein a login script, which was previously modified on the client device, is provided to search for updated self-contained configuration files as part of a client login procedure, and wherein detection of the updated self-contained configuration files results in an application of particular parameters of the updated self-contained configuration files being applied against corresponding security software of the client device to replicate the security policy, and wherein the self-contained configuration file includes a first instruction that renders the self-contained configuration file unusable by the client device after a certain period of time, and wherein the self-contained configuration file includes a second instruction for deleting the self-contained configuration file once it is executed; and
    receiving an error message if the self-contained configuration file is not installed on the client device.

7. The non-transitory computer-readable media of claim 6, the operations further comprising:
    storing the self-contained configuration file in a database.

8. A system comprising:
    a processor;
    a memory coupled to the processor through a bus, wherein the system is configured to: provide a configuration procedure for an antivirus program to determine which parameters of a security policy have changed;
    create a self-contained configuration file based on the changed security policy parameters and underlying security programs that are affected by the changed security policy parameters;
    determine which of the underlying security programs are affected based on the determined changed security policy parameters;

encapsulate the changed parameters and execution instructions associated with the affected programs to create the self-contained configuration file;
provide the self-contained configuration file in an e-mail to be communicated over a network from a server to a client device for subsequent installation at the client device, wherein a login script, which was previously modified on the client device, is provided to search for updated self-contained configuration files as part of a client login procedure, and wherein detection of the updated self-contained configuration files results in an application of particular parameters of the updated self-contained configuration files being applied against corresponding security software of the client device to replicate the security policy, and wherein the self-contained configuration file includes a first instruction that renders the self-contained configuration file unusable by the client device after a certain period of time, and wherein the self-contained configuration file includes a second instruction for deleting the self-contained configuration file once it is executed; and
receive an error message if the self-contained configuration file is not installed on the client device.

9. The system of claim 8 further comprising a network interface coupled to the processor through the bus.

10. The method of claim 1, wherein the self-contained configuration file is determined to be uncontaminated before applying certain parameters of the security policy to the antivirus program.

11. The method of claim 1, wherein certain parameters of the security policy include parameters that have changed since a previous self-configuration file was created.

12. The method of claim 4, wherein the self-contained configuration file is manually stored on the server.

13. The method of claim 1, wherein the application of the parameters of the security policy to the antivirus program installed on the client device is performed as a background task.

14. The method of claim 1, further comprising:
storing the self-contained configuration file on the server for subsequent downloading by a plurality of devices.

15. The method of claim 1, wherein the self-contained configuration file can be propagated between the client device and a peer client device in order to replicate the security policy at the peer client device.

16. The non-transitory computer-readable media of claim 6, wherein a policy script that executes a subsequent self-contained configuration file is provided as part of an operating system task schedule.

17. The non-transitory computer-readable media of claim 6, wherein the self-contained configuration file is one of an executable file, a registry file, and an extensible markup language file.

18. The non-transitory computer-readable media of claim 6, wherein the application of the parameters of the security policy to the antivirus program installed on the client device is performed as a background task.

19. The non-transitory computer-readable media of claim 6, the operations further comprising:
storing the self-contained configuration file on the server for subsequent downloading by a plurality of devices.

20. The non-transitory computer-readable media of claim 6, wherein the self-contained configuration file can be propagated between the client device and a peer client device in order to replicate the security policy at the peer client device.

* * * * *